United States Patent
Griffin

(10) Patent No.: US 12,360,308 B2
(45) Date of Patent: Jul. 15, 2025

(54) FIBER OPTIC STRUCTURE

(71) Applicant: Cyclone Biosciences, LLC, Phoenix, AZ (US)

(72) Inventor: Stephen E. Griffin, Peoria, AZ (US)

(73) Assignee: CYCLONE BIOSCIENCES, LLC, Phoenix, AZ (US)

( * ) Notice: Subject to any disclaimer, the term of this patent is extended or adjusted under 35 U.S.C. 154(b) by 0 days.

(21) Appl. No.: 18/529,355

(22) Filed: Dec. 5, 2023

(65) Prior Publication Data
US 2024/0192436 A1    Jun. 13, 2024

Related U.S. Application Data

(60) Provisional application No. 63/430,733, filed on Dec. 7, 2022.

(51) Int. Cl.
| | | |
|---|---|---|
| *G02B 6/02* | (2006.01) | |
| *G02B 6/26* | (2006.01) | |
| *G01J 3/02* | (2006.01) | |

(52) U.S. Cl.
CPC .............. *G02B 6/02* (2013.01); *G02B 6/262* (2013.01); *G01J 3/0221* (2013.01)

(58) Field of Classification Search
CPC .......... G02B 6/02; G02B 6/262; G01J 3/0221
See application file for complete search history.

(56) References Cited

U.S. PATENT DOCUMENTS

2014/0003081 A1\* 1/2014 Wang ............... G02B 6/262
362/555

OTHER PUBLICATIONS

Agilent, UV-Vis & UV-Vis-NIR Accessories, Cary 60 Fiber Optic Couplers, Retrieved from https://www.agilent.com/en/product/molecular-spectroscopy/uv-vis-uv-vis-nir-spectroscopy/uv-vis-uv-vis-nir-accessories/cary-60-fiber-optic-coupler, Copyright 2023 Agilent Technologies, Inc., 5 pages.

BWTek: a Metrohm Group Company, Spectrometer Knowledge, Part 7: Fiber Optic Bundles, Retrieved from https://bwtek.com/spectrometer-part-7-fiber-optic-bundles/, Copyright 2021 B&W Tek, 3 pages.

MKS: Newport, Rectangular to Circular Fiber Optic Bundles, Retrieved from https://www.newport.com/f/rectangular-to-circular-fiber-bundles, Copyright 2023 Newport Corporation, 2 pages.

Thorlabs, Round-to-Linear Fiber Optic Bundles, Retrieved from https://www.thorlabs.com/newgrouppage9.cfm?objectgroup_id=7719, Copyright 1999-2023 Thorlabs, Inc., 2 pages.

\* cited by examiner

*Primary Examiner* — Michael P Mooney
(74) *Attorney, Agent, or Firm* — Quarles & Brady, LLP; Yakov S. Sidorin

(57) ABSTRACT

A single strand of an optical fiber with a single optical core that is dimensioned at one end to resemble a blade or a head of a flat-head screwdriver. Such strand of the optical fiber is configured for optical coupling of light between such single strand and a spectrometric/spectrophotometric apparatus while employing an input slit and/or an output slit of the apparatus. A method for fabricating such single strand. A fiber optic cable containing, as an optical medium, only such single strand. A method for handling light with the use of such optical fiber and/or the optical cable.

20 Claims, 5 Drawing Sheets

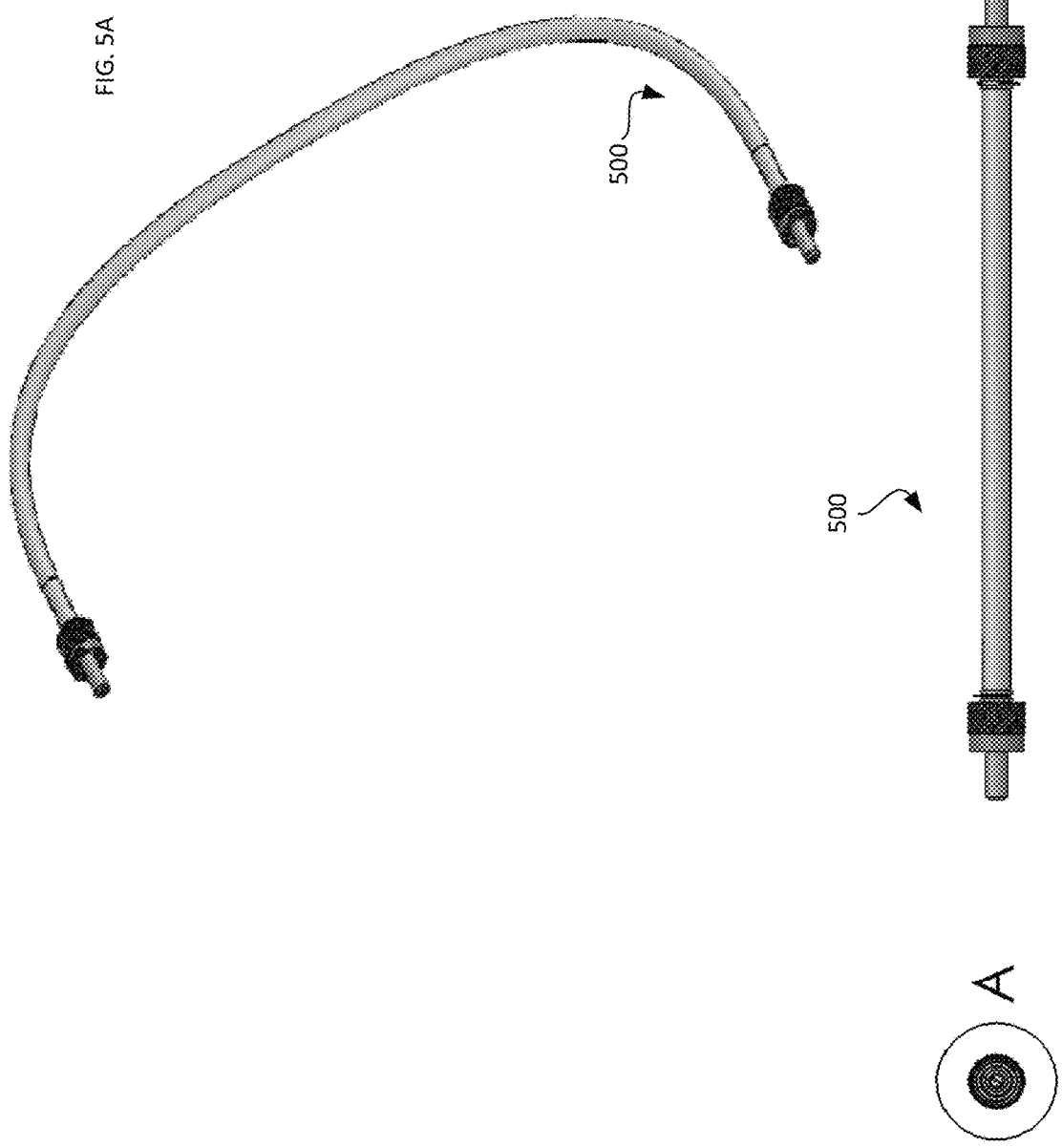

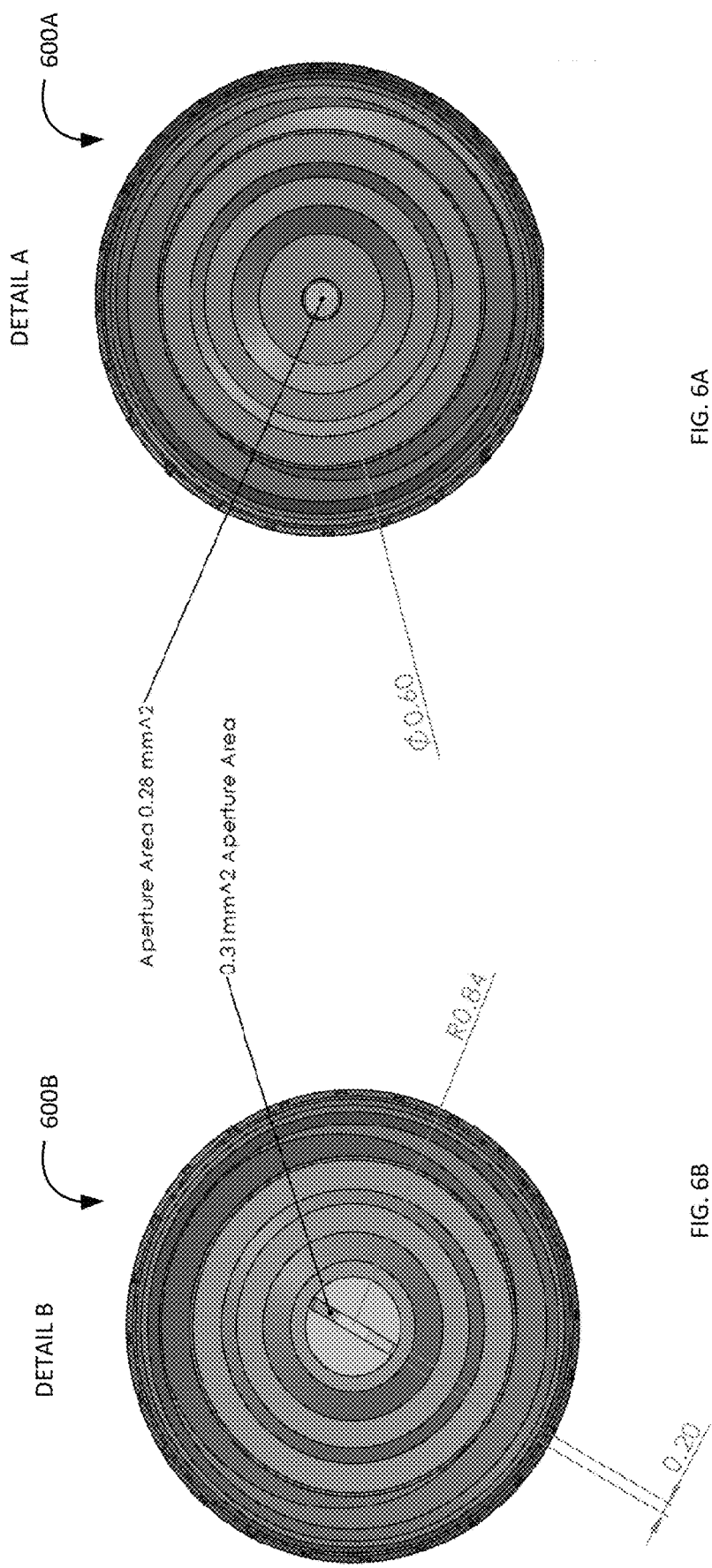

FIBER OPTIC STRUCTURE

CROSS-REFERENCE TO RELATED APPLICATIONS

This U.S. patent application claims priority from and benefit of the U.S. Provisional Patent Application No. 63/430,733 filed on Dec. 7, 2022, the disclosure of which is incorporated by reference herein.

TECHNICAL FIELD

The present invention relates to optical fiber structures configured for optimal exchange of light with a spectrophotometric device containing an input and/or output slit.

SUMMARY OF THE INVENTION

Embodiments of the invention provide an optical fiber element that has an axis, a proximal end, a distal end, a single (one, the only) optical fiber core and an optical fiber cladding, and that is configured such that—at the distal end—the optical fiber core is defined by a substantially cylindrically-shaped solid body of a core material and the optical fiber cladding is defined by a substantially cylindrically-shaped hollow body of a cladding material, while at the proximal end the optical fiber core has a proximal cross-section bound by a perimeter that includes two substantially parallel lines and two curved lines (with each of the two curved lines connecting ends of a corresponding of the two substantially parallel lines with one another). In at least one specific case, the proximal cross-section is substantially axially symmetrical about the axis and/or the two substantially parallel lines are substantially straight lines. Alternatively or in addition, the optical fiber element may be configured such that, at the proximal end, the optical fiber cladding remains present only at one or more of curved outer surfaces of the optical fiber core (each of which curved outer surfaces is represented in the proximal cross-section by corresponding one or more of the two curved lines). Alternatively or in addition, the optical fiber element may be structured such that, at the proximal end, the optical fiber cladding has a cross-section including only two areas (which two areas are substantially symmetric to one another about the axis). In this latter case, each of the two areas may have a closed perimeter defined by three substantially straight lines and one of the two curved lines. Alternatively or in addition—and substantially in every implementation—the optical fiber element may be configured such that, at the proximal end, the optical fiber core has longitudinally (that is, axially) extending surfaces, which surfaces are (a) are represented in the proximal cross-section by the two substantially parallel lines, and which are optionally coated with a layer of material configured to increase reflectance of light incident onto such layer from inside the optical fiber element, and/or (b) substantially planar. Substantially in every embodiment, the proximal end of the optical fiber element may be dimensioned such that as to form an up-taper (with the ratio of a first maximum dimension of the optical fiber core at the proximal cross-section to a second maximum dimension of the optical fiber core at a distal cross-section of the optical fiber element at the distal end of at least 2:1, and/or of at least 3:1, and/or of at least 4:1). The up-taper may be dimensioned to be substantially spatially monotonic. Depending on the specifics of a particular implementation, a diameter of the optical core at the distal end is made at least one hundred microns, and/or of about 600 microns, while the optical fiber core may be insured to include only one single optical fiber core region. Substantially in every implementation, the optical fiber core can be made structurally uninterrupted not only at every point along the axis but also in any cross-sectional plane drawn transversely to the axis at such point—such that the optical fiber core does not contain a dielectric interface within an outer boundary of the optical fiber core. Alternatively or in addition, the optical fiber core at the proximal end may be limited on an outside by two substantially planar surfaces, and/or optionally the proximal cross-section of the optical fiber element an be formed to be substantially rectangular.

Embodiments of the invention additionally provide an article of manufacture that includes a combination of any of the embodiments of the optical fiber element alluded to above with a spectrometric (and/or spectrophotometric) device or system with which such optical fiber element is to be used.

Embodiments also provide a method that includes propagating light through a proximal end of any embodiment of the optical fiber element alluded to above while having such light interact with the optical fiber cladding only at first and second axially extending stripes of the optical fiber cladding (here, the first and second stripes are formed to be substantially diametrically opposing one another and do not a common point with one another within a longitudinal extent of the proximal end. The step of propagating may include propagating the light through the optical fiber core that has, within the longitudinal extent of said proximal end, a proximal cross-section bound by a perimeter including two substantially parallel lines and two curved lines (where each of the two curved lines connects with one another ends of a corresponding of the two substantially parallel lines) and/or may include propagating the light through the proximal end of the optical fiber element that has the optical fiber core shaped as a head of a flat-head screwdriver. Alternatively or in addition, substantially every embodiment of the method may include a step of spatially positioning a facet of the proximal end of the optical fiber element at or in a slit of a spectrometric device and a step of directly coupling light, channeled to the proximal end from a distal end through the optical fiber element, into the slit and/or a step of directly coupling light passing through the slit into the proximal end to be channeled through the optical fiber element to the distal end thereof. The step or process of propagating light through the proximal end of the optical fiber element may include internally reflecting the light at substantially planar surfaces of the optical fiber core at the proximal end.

Embodiments of the invention further provide a method that includes dimensioning a proximal end of an optical fiber element (that has an axis, the proximal end, a distal end, an optical fiber core, and an optical fiber cladding) to form the reshaped optical fiber element in which—at the proximal end—the optical fiber core has a proximal cross-section bound by a perimeter including two substantially parallel lines and two curved lines, each of the two curved lines connecting ends of a corresponding of the two substantially parallel lines with one another. In such method, a step of dimensioning may include micromachining the optical fiber component with light, and/or the method may additionally include a process of configuring the proximal end of the optical fiber component to form an up-taper. (In the latter case, such configuring the proximal end may be configured to ensure that the formed up-taper is substantially spatially monotonic). IN at least one implementation of the method, a ratio of a first maximum dimension of the optical fiber core at a facet of the proximal end to a second maximum dimension of the optical fiber core at a facet of the distal end is at least 2:1, and/or at least 3:1, and/or at least 4:1. Alternatively or in addition, and substantially in every implementation of the method, the method may include a step of re-shaping or spatially transforming the optical fiber component that has a diameter of the optical fiber core at the distal end of at least one hundred microns and/or of about 600 microns, and/or include a step of reshaping the optical fiber core of the optical fiber component, at the proximal end, to form the optical fiber cladding that includes, in a proximal cross-section, only two areas that are substantially symmetric to one another about the axis. (In one specific case of the latter, the optical fiber cladding at the proximal end may be structured such that each of these two areas has a perimeter defined by three substantially straight lines and one of the two curved lines.) The method optionally includes a process of coating at least one of longitudinally-extending surfaces of the optical fiber core, which are represented by said two substantially parallel lines in the proximal cross-section, with a layer of material configured to increase reflectance of light incident onto such layer from inside of the optical fiber core.

Embodiments of the invention additionally provide an optical fiber that includes an optical fiber facet transverse to an optical fiber axis, an optical fiber cladding, and an optical fiber core having first and second substantially planar surfaces that extend along the optical fiber axis and that are not covered by the optical fiber cladding. In at least one case, the first and second substantially planar surfaces are terminated at the facet (here, the first and second substantially planar surfaces may be substantially parallel to one another and are separated from one another along a first axis, and/or a diameter of the optical fiber core region may be limited by the first and second substantially planar surfaces and—as measured along a second axis transverse to the first axis—may be dimensioned to vary monotonically along the axis of the optical fiber with a distance from the facet. Alternatively or in addition, the fiber core may be covered by the optical fiber cladding between the first and second substantially planar surfaces. (In the latter case, optionally, as seen at the facet, a portion of the optical fiber cladding present between the first and second substantially planar surfaces may be dimensioned to have a closed perimeter formed by three substantially straight lines and a curved line.

BRIEF DESCRIPTION OF THE DRAWINGS

The invention will be more fully understood by referring to the following Detailed Description of Specific Embodiments in conjunction with the Drawings, of which:

FIGS. 5A, 5B, 5C, 5D, 6A, and 6B schematically depict an optical fiber cable containing an embodiment of a single optical fiber element structured according to the idea to the invention.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another. While specific embodiments are depicted in the figures with the understanding that the disclosure is intended to be illustrative, these specific embodiments are not intended to limit the scope of invention the implementations of which are described and illustrated herein.

DETAILED DESCRIPTION

Figure 1:
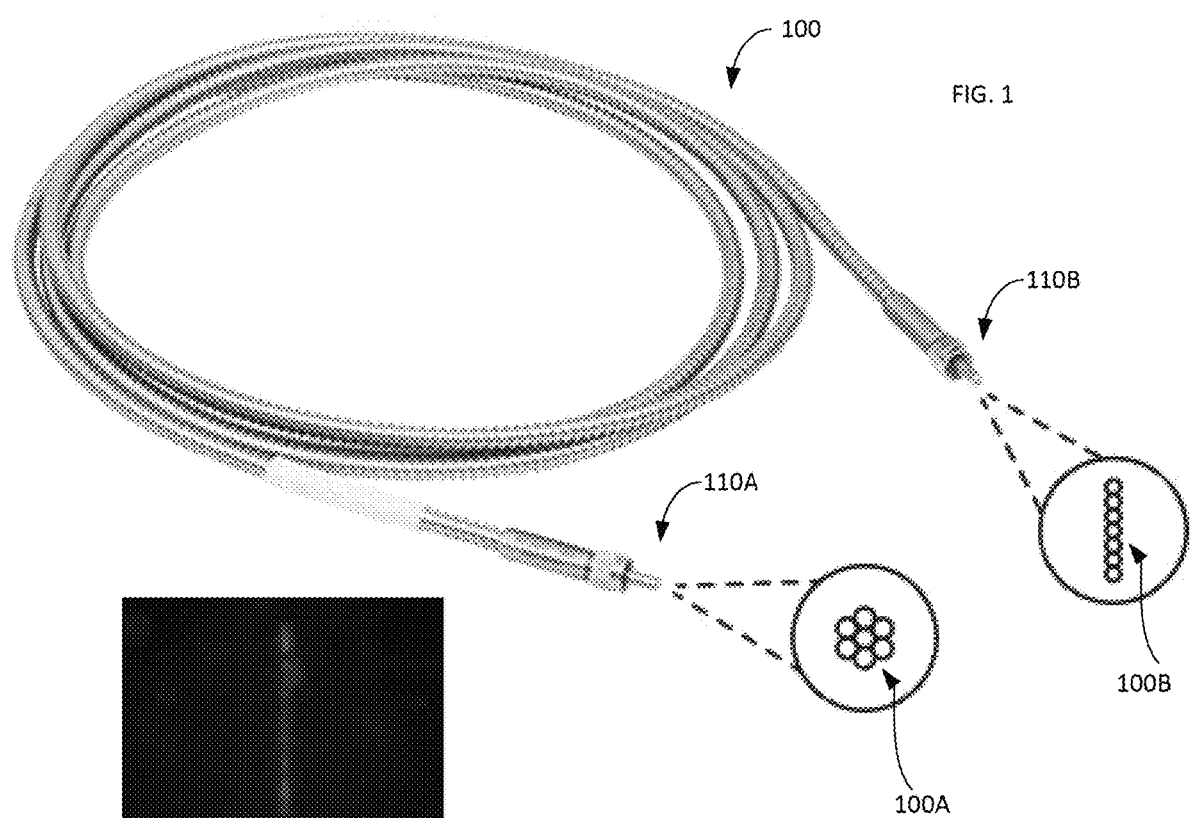
FIGS. 1, 2, 3A, 3B, and 3C illustrate a typical embodiment of related art.

One of persisting problems of any spectroscopic measurement—just like any optical measurement in general—is well recognized in the art: there is never enough light. Well-established in related art methodologies employed for increase of amount of and/or optimization of a spatial distribution of light (for example, fluorescent light characterizing a target specimen subject to investigation) propagating between the fiber optics and a conventional spectro (photo)metric device—such as a spectrometer having an input/output slit(s)—utilize an optical cable in which multiple strands of fiber optic elements (or, interchangeably, multiple optical fiber strands or multiple optical fibers) are combined/arranged together in a pack. For example, as shown in FIG. 1, such optical cable 100 may be configured to have the constituent optical fiber strands to be arranged in a hex-pack 100A at the end 110A (that in one case may be used as a light collection end of the cable, distal to a spectrometer) and terminated with the end 110B (that in such a case can be used as the output end) in which the constituent optical fibers are aggregated (stacked) in a line 100B.

The results of this and similar attempts to mimic the geometry of the rectangular aperture of a typical spectrometer with the geometry of the end 110B in the so-called "line-to-spot" optical fiber bundles arguably allow to increase of optical coupling efficiency between the end 110B and the slit of the spectrometer. The linearly-arranged stack of multiple (as shown in FIG. 1—seven) constituent optical fibers at the end 110B of the cable 100 matches the shape of the entrance slit better than a single fiber or round bundle configuration and therefore increases the amount of light entering the optical end spectrometric device from the end 110B of the optical fiber cable (see, for example, thorlabs.com for more information). The "linear-ish" end 110B can also be used as a quasi-line source of light.

Figure 2:
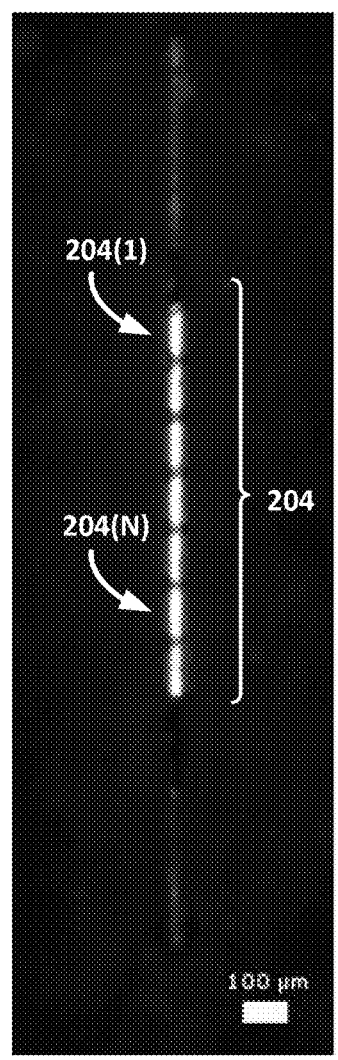

FIG. 2 illustrates an example of the spatial light distribution at the end 100B of the fiber bundle 100, which includes seven spatially distinct light beams emanating, respectively, from corresponding individual optical fiber cores of the constituent optical fibers of the bundle 100. Notably, not only the optical fiber core region of the bundle 100 is represented by a multiplicity of structurally distinct and separated (interrupted) from one another—as is observed in a cross-sectional plane drawn transversely to the axis of the bundle—optical fiber cores of the constituent fiber strands, but also the output light distribution at the facet of the end 100B of such bundle contains spatially distinct and separated from one another spots of light. Understandably, due to the principle of optical reciprocity, light distribution to be optimally coupled into the end 100B also necessarily has to be organized into spatially-distinct and separated from one another spots of light in order to achieve optimal coupling.

Figure 3:
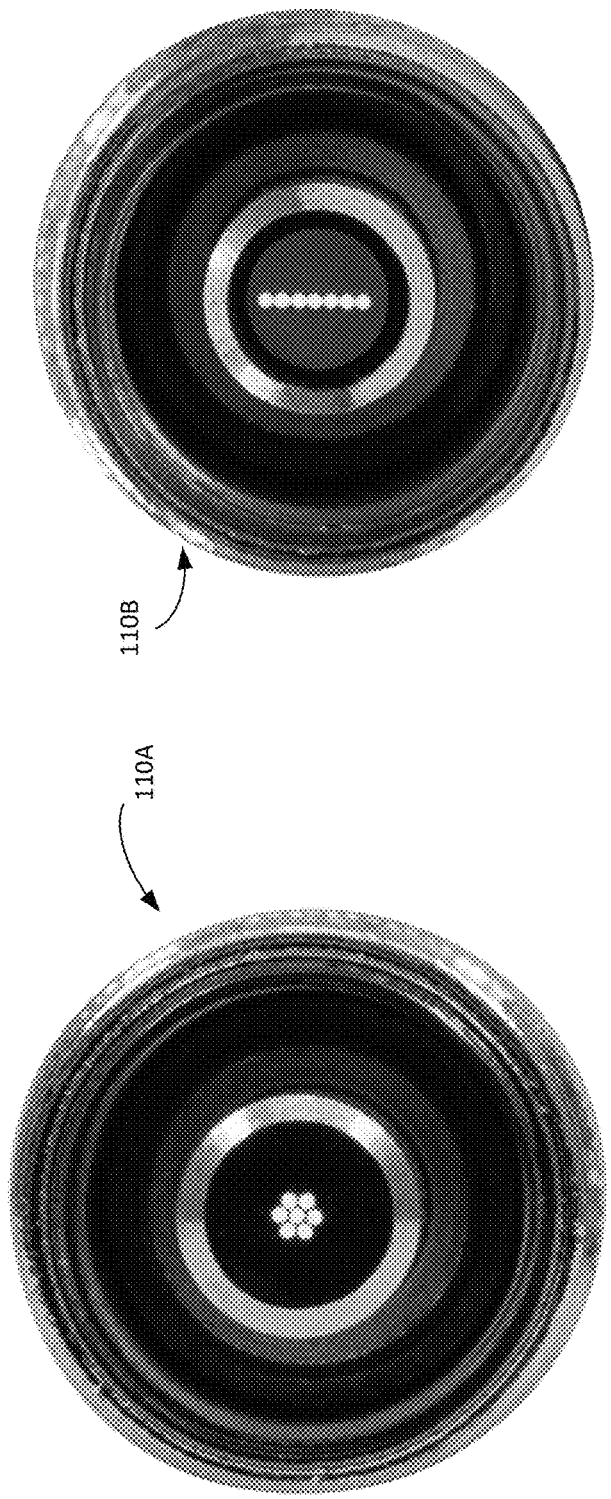

FIGS. 3A, 3B illustrate in plan views the ends 110A, 110B of the optical fiber cable 100, in which the bundle of optical fibers can be seen surrounded with the appropriate mounting hardware, while FIG. 3C provides an example of various input-to-output configurations of the constituent optical fiber strands in optical cables offered for industrial use in related art (see thorlabs.com, for example)

A person of ordinary skill in the art is well aware that, in order to take advantage of such "stacked" fiber optic configuration, a cylindrical lens must be used often to prevent the vast majority of the light exiting the cable 100 from the "stacked in line" bundle of fibers at the end 100B coupled with the input slit of the optical spectrometer from being imaged (by the optical system of the spectrometer) to locations above and below the optical detector—and, therefore, from being lost for the purposes of the spectrometric measurement.

Related attempts to reshape the output profile of the optical mode of the optical fiber component at the facet of such component involved development of optical fibers drawn such as to form a fiber core that is rectangular in a cross-section (and typically has dimensions on the order of 50 microns by 50 microns or 50 microns by 100 microns) and that is substantially completely surrounded by the fiber cladding. Notably, the divergence of an output beam (the numerical aperture) from such optical fiber still remains a critical factor in deciding on parameters of the lens imaging such light output onto the slit of a spectro(photo)metric device.

As discussed in this disclosure, a problem of related art manifesting in difficulties of optically and/or geometrically matching aperture(s) associated with input and/or output slit of an optical measurement system (such as spectrometer or spectrophotometer) with that of an optical fiber cable, coupled with such a slit and delivering light to/from the spectro(photo)metric device, is solved by configuring the optical fiber cable to include a single fiber optic stand (that is, one and only single optical fiber component) one end of which is structured/shaped as or to resemble a blade or a head of a flat-head screwdriver (which is also commonly known in the art as standard, common blade, flat-blade, slot-head, straight, flat, or flat-tip screwdriver) while the material of the cladding region is mostly removed and remains present only at diametrically-opposing narrow edge sides as seen in such cross-section (in which case the optical cladding, and the end of the optical fiber component, is present only in the form of two diametrically-opposing to one another stripes). Optionally, in one specific case, the cross-section of a single core region is such single optical fiber component may be additionally dimensioned to be substantially co-extensive with a chosen slit of the spectro (photo)metric device. Notably, care is taken to maintain the single core region of an embodiment of the single optical fiber component structurally and materially uninterrupted not only along an axis of the component but also in any cross-sectional plane drawn transversely to such axis.

Figure 4:
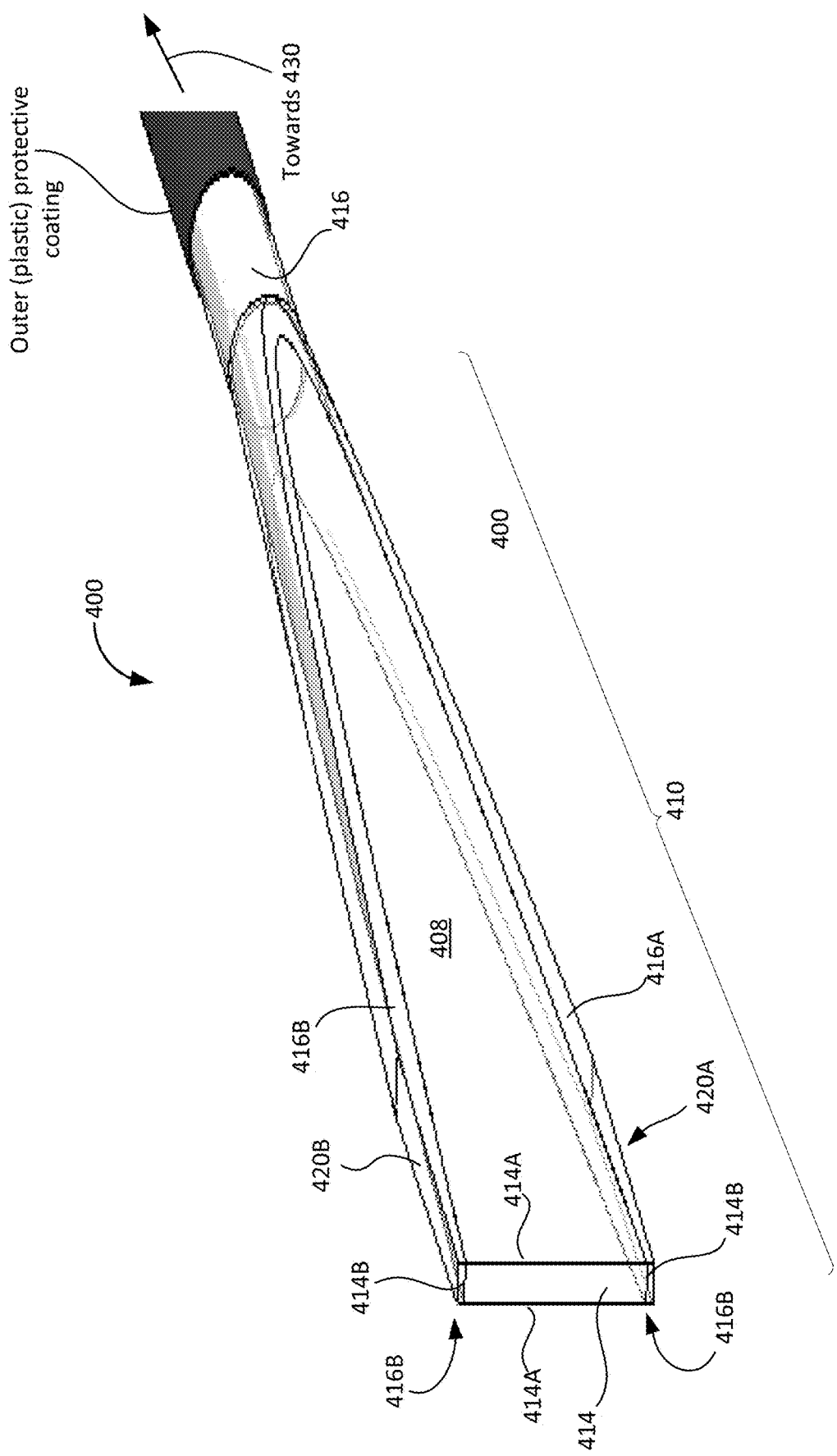
FIG. 4 schematically illustrates an end of an optical fiber element structured according to the idea of the invention.

FIG. 4 provides a schematic illustration of a single strand optical fiber 400 the end 404 of which is judiciously dimensioned to have the single optical fiber core region 408 (defined elsewhere along the fiber 400 by a substantially cylindrically-shaped solid body of a core material) with a cross-section 414 (at the facet of the end 404) bound by a perimeter including two substantially parallel lines 414A and two curved lines 414B. Each of these two curved lines 414B connects the ends of a corresponding one of the two substantially parallel lines 414A. In such embodiment, the optical fiber cladding 416 (which is defined elsewhere along the fiber 400 by a substantially cylindrically-shaped body of a cladding material wrapped around the body of the core material) is present in the form of two substantially diametrically opposing stripes 416A, 416B. Accordingly, as seen in the cross-section of the end 404—for example, at the output facet of it—the optical fiber cladding 416A, 416B is present only at least one of the two curved outer surfaces of the optical fiber core that are represented in the proximal cross-section by the two curved lines 414B. Such geometrical and/or structural transformation of the facet of the end 410 of the fiber 400 results in reshaping of the end 410 to substantially resemble a head of a flat-head screwdriver. While being an optional step of transformation, the end 410 can be additionally up-tapered such as (a) to have the size of the facet of the end 410 to be substantially equally dimensioned with a slit of a spectro(photo)metric device with which the optical fiber 400 is intended to be used and/or (b) to ensure that the divergence of light output from the facet is substantially matched with numerical aperture of the internal optical system. (For the purposes of this disclosure and the appended claims, a fiber optic taper is defined as a piece of optical fiber or a fiber optic element having a radius of the optical fiber core portion of the fiber that varies along the length of such fiber optical element. An "up-taper", in this case, is defined as fiber optic taper having a first radius of the optical fiber core at a free end of the fiber that is greater than a second radius of the optical fiber core at a different location along the length of the taper. In one implementation of the up-taper of the device of the invention that tapering of the optical fiber is spatially substantially monotonic (or substantially spatially monotonic), that is carried out to form the surface of the up-tapered surface of the optical fiber core that is differentiable at every point and/or that is devoid of creases or folds or seams.) In this latter case—in advantageous contradistinction from the related art—no additional optic is required between the facet of the end 410 and the slit of the device for optimal coupling of light between the two.

Optionally, the proximal end 410 of the optical fiber 400 may be further re-shaped—as seen in the case of FIG. 4—to limit at least one of the remaining stripes 416A, 416B of the optical fiber cladding on the outer side with a corresponding substantially planar surface (in FIG. 4—surfaces 420A, 420B are shown to limit the optical fiber cladding on both side of the optical axis). In this case, each of the two areas of the optical fiber cladding 416A, 416B seen in a cross-section of the fiber 400 (for example, at the facet 414) has a perimeter defined by three substantially straight lines and one of the two curved lines.

The structure of the single optical fiber 400 at the opposite end 430 remains substantially unmodified and includes a single fiber core (dimensioned as a solid cylindrical body) and an optical cladding wrapped around the only, single fiber core. When the embodiment 400 is intended for use in surgical applications, the diameter of the single fiber core at the end 430 may be chosen to be at least a hundred microns and, in a specific application, about 600 microns. In at least one case, the end 410 of the optical fiber element 400 may be configured as an up-taper such that a ratio of a first maximum dimension of the optical fiber core 408 at the cross-section 414 to a second maximum dimension of the optical fiber core at a distal cross-section of the optical fiber element at the distal end 430 is at least 2:1 and/or at least 3:1 and/or at least 4:1.

FIGS. 5B, 5D, 6A, 6B illustrate, in several views, plan views of the ends of the optical cable 500 that contains only one, single strand of optical fiber structured according to the idea of the invention. View B presented in FIG. 5D corresponds to and represents the cable termination element 600A shown in FIG. 6A, while view A of FIG. 5B corresponds to and represents the cable termination element 600B of FIG. 5D. FIGS. 6A, 6C illustrate the optical cable 500 itself. Certain dimensions that may be indicated in FIGS. 5A-5D and/or 6A, 6B are provided as examples only, and are not defining or limiting in any shape or form.

In order to fabricate an embodiment of the invention, one end of an optical fiber component containing an optical fiber with a single optical core can be micromachined such as to reshape this end to form the optical fiber core having a cross-section bound by a perimeter including two substantially parallel lines and two curved lines (each of the two curved lines connecting the two substantially parallel lines at corresponding ends thereof) and/or the optical fiber cladding present only at one or more of curved outer surfaces of the optical fiber core that are represented in the proximal cross-section by such two curved lines. (The micromachining can be accomplished with the use of, for example, light produced by a $CO_2$ laser source). Optionally, this end of the optical fiber can be additionally up-tapered to increase a dimension of the fiber core at the facet of the end of the optical fiber, as discussed above. A skilled person will readily appreciate that a process of handling light with an embodiment of the invention necessarily includes a step of propagating light through a portion of an optical fiber element while interacting light with the optical fiber cladding only at the first and second axially extending stripes of the optical fiber cladding (which first and second stripes are substantially diametrically opposing one another and not having a common point within a longitudinal extent of said portion), and/or a step of propagating the light through the optical fiber core that has, within the longitudinal extent of such portion, a proximal cross-section bound by a perimeter including two substantially parallel lines and two curved lines (here, each of the two curved lines connects the two substantially parallel lines at corresponding ends of the lines).

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For the purposes of this disclosure and the appended claims, the expression of the type "element A and/or element B" is defined to have the meaning that covers embodiments having element A alone, element B alone, or elements A and B taken together and, as such, is intended to be equivalent to "at least one of element A and element B".

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. An optical fiber element having an axis, a proximal end, and a distal end and comprising:
   a single optical fiber core; and
   an optical fiber cladding,
   (i) wherein, at the distal end, the single optical fiber core is defined by a substantially cylindrically-shaped solid body of a core material;
   (ii) wherein, at the proximal end, the single optical fiber core has a proximal cross-section bound by a perimeter that includes two substantially parallel lines and two curved lines, each of the two curved lines connecting ends of a corresponding of the two substantially parallel lines with one another;
   (iii) wherein, at the proximal end, longitudinally-extending surfaces of the optical fiber core, which are represented in the proximal cross-section by said two substantially parallel lines, are coated with a layer of material configured to increase reflectance of light incident onto such layer from inside the optical fiber element, and/or wherein said longitudinally-extending surfaces are substantially planar; and
   (iv) wherein the proximal end of the optical fiber element is configured to form an up-taper that is spatially substantially monotonic.

2. An optical fiber element according to claim 1, wherein the proximal end of the optical fiber element is configured to form an up-taper such that a ratio of a first maximum dimension of the optical fiber core at the proximal cross-section to a second maximum dimension of the optical fiber core at a distal cross-section of the optical fiber element at the distal end is at least 2:1 and wherein a diameter of the optical core at the distal end is about 600 microns.

3. An optical fiber element according to claim 1, wherein the proximal end is configured to form an up-taper such that a ratio of a first maximum dimension of the optical fiber core at the proximal cross-section to a second maximum dimension of the optical fiber core at a cross-section of the optical fiber element at the distal end is at least 3:1 and wherein a diameter of the optical core at the distal end is at least 100 microns.

4. An optical fiber element according to claim 1, wherein the proximal end of is configured to form an up-taper such that a ratio of a first maximum dimension of the optical fiber core at the proximal cross-section to a second maximum dimension of the optical fiber core at a distal cross-section of the optical fiber element at the distal end is at least 4:1.

5. An optical fiber element according to claim 1, wherein a diameter of the optical core at the distal end is at least one hundred microns.

6. An optical fiber element according to claim 1, wherein a diameter of the optical core at the distal end is about 600 microns.

7. An optical fiber element according to claim 1, wherein the optical fiber core includes only one single optical fiber core region.

8. An optical fiber element according to claim 1, wherein the optical fiber core remains structurally uninterrupted not only at every point along the axis but also in any cross-sectional plane drawn transversely to the axis at said point such that the optical fiber core does not contain a dielectric interface within an outer boundary of the optical fiber core.

9. An optical fiber element according to claim 1, wherein, when said longitudinally-extending surfaces are substantially planar, said longitudinally-extending surfaces are inclined with respect to one another.

10. An optical fiber element according to claim 1, wherein, at the proximal end, the optical fiber cladding is present only at outer surfaces of the single optical fiber core that are represented in the proximal cross-section by said two curved lines.

11. An optical fiber element having an axis, a proximal end, and a distal end and comprising:
   a single optical fiber core; and
   an optical fiber cladding,
   (i) wherein, at the distal end, the single optical fiber core is defined by a substantially cylindrically-shaped solid body of a core material;
   (ii) wherein, at the proximal end, the single optical fiber core has a proximal cross-section bound by a perimeter that includes two substantially parallel lines and two curved lines, each of the two curved lines connecting ends of a corresponding of the two substantially parallel lines with one another;
   (iii) wherein, at the proximal end, longitudinally-extending surfaces of the optical fiber core, which are represented in the proximal cross-section by said two substantially parallel lines, are coated with a layer of material configured to increase reflectance of light incident onto such layer from inside the optical fiber element, and/or wherein said longitudinally-extending surfaces are substantially planar; and
   (iv) wherein the proximal end of is configured to form an up-taper such that a ratio of a first maximum dimension of the optical fiber core at the proximal cross-section to a second maximum dimension of the optical fiber core at a distal cross-section of the optical fiber element at the distal end is at least 4:1.

12. An optical fiber element according to claim 11, wherein the proximal end of the optical fiber element is configured to form an up-taper that is spatially substantially monotonic.

13. An optical fiber element according to claim 11, wherein a diameter of the optical core at the distal end is at least one hundred microns.

14. An optical fiber element according to claim 11, wherein, when said longitudinally-extending surfaces are substantially planar, said longitudinally-extending surfaces are inclined with respect to one another.

15. An optical fiber element according to claim 11, wherein the optical fiber core includes only one single optical fiber core region.

16. An optical fiber element according to claim 11, wherein the optical fiber core remains structurally uninterrupted not only at every point along the axis but also in any cross-sectional plane drawn transversely to the axis at said point such that the optical fiber core does not contain a dielectric interface within an outer boundary of the optical fiber core.

17. An optical fiber element having an axis, a proximal end, and a distal end and comprising:
   a single optical fiber core; and
   an optical fiber cladding,
   (i) wherein, at the distal end, the single optical fiber core is defined by a substantially cylindrically-shaped solid body of a core material;
   (ii) wherein, at the proximal end, the single optical fiber core has a proximal cross-section bound by a perimeter that includes two substantially parallel lines and two curved lines, each of the two curved lines connecting ends of a corresponding of the two substantially parallel lines with one another;
   (iii) wherein, at the proximal end, longitudinally-extending surfaces of the optical fiber core, which are represented in the proximal cross-section by said two substantially parallel lines, are coated with a layer of material configured to increase reflectance of light incident onto such layer from inside the optical fiber element, and/or wherein said longitudinally-extending surfaces are substantially planar; and
   (iv) wherein the proximal end of the optical fiber element is configured to form an up-taper such that a ratio of a first maximum dimension of the optical fiber core at the proximal cross-section to a second maximum dimension of the optical fiber core at a distal cross-section of the optical fiber element at the distal end is at least 3:1 and wherein a diameter of the optical core at the distal end is at least 100 microns.

18. An optical fiber element according to claim 17, wherein the proximal end of the optical fiber element is configured to form an up-taper that is spatially substantially monotonic.

19. An optical fiber element according to claim 17, wherein, when said longitudinally-extending surfaces are substantially planar, said longitudinally-extending surfaces are inclined with respect to one another.

20. An optical fiber element according to claim 17, wherein the optical fiber core includes only one single optical fiber core region.

* * * * *